July 24, 1934.   E. N. FOX   1,967,573
SECTIONAL MACHINERY PACKING
Filed Dec. 8, 1932   2 Sheets-Sheet 1
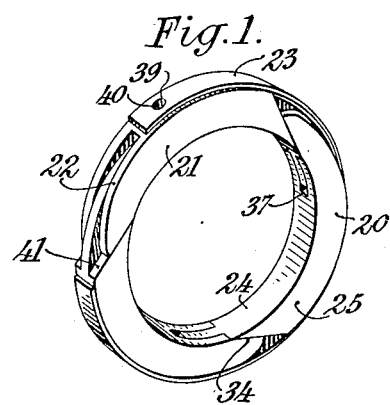
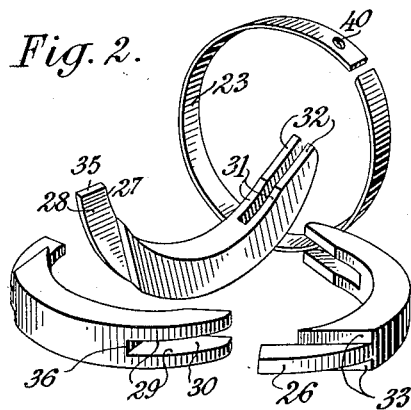
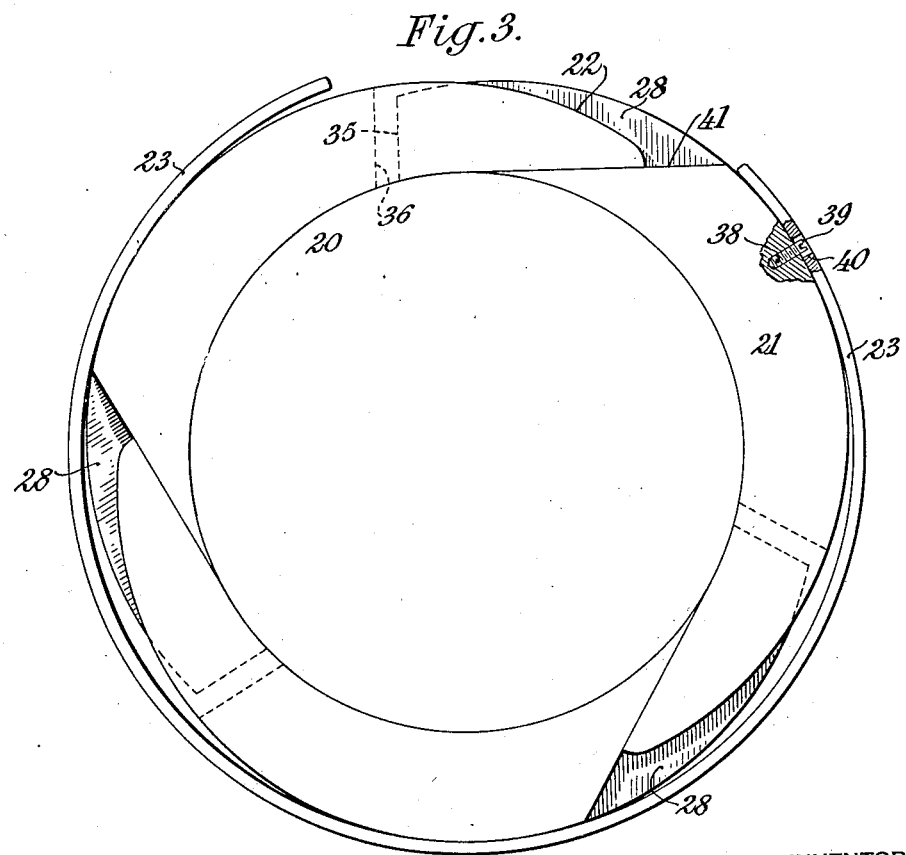
INVENTOR
Edgar N. Fox,
BY Fraser, Myers & Manley,
ATTORNEYS July 24, 1934.   E. N. FOX   1,967,573
SECTIONAL MACHINERY PACKING
Filed Dec. 8, 1932   2 Sheets-Sheet 2

INVENTOR
Edgar N. Fox,
BY Fraser, Myers & Manley
ATTORNEYS

Patented July 24, 1934

1,967,573

UNITED STATES PATENT OFFICE 1,967,573

SECTIONAL MACHINERY PACKING

Edgar N. Fox, Palmyra, N. Y., assignor to The Garlock Packing Company, Palmyra, N. Y., a corporation of New York Application December 8, 1932, Serial No. 646,239

6 Claims. (Cl. 309—29)

This invention relates to improvements in sectional machinery packing of the type usually constructed of cast iron, soft steel, bronze or other appropriate metal.

It is an object of the invention to provide a form of sectional packing having joints between its component sections such as will automatically readjust themselves and continue to effect an efficient fluid seal until the ring sections have worn away to an extent such that the residue is but a small fraction of their original mass.

The invention is adapted for use in the form of either a piston ring or a rod packing.

In the accompanying drawings illustrating preferred forms of the invention,—

Figure 1 is a perspective view of an assembled packing ring embodying the invention in a form adapted for use as a rod packing.

Fig. 2 is a group of perspective views of ring segments and a resilient spring which may be assembled to form the packing ring illustrated by Fig. 1.

Fig. 3 is a side view of the packing ring illustrated by Fig. 1.

Figure 4:
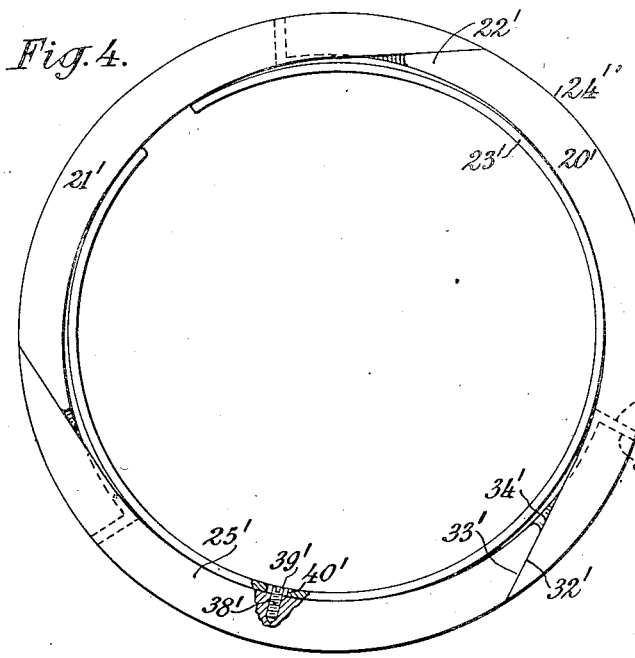
Fig. 4 is a side view of a packing ring embodying the invention in a form adapted for use as a piston ring.

The rod packing illustrated by Figs. 1 to 3, inclusive, comprises a sectional ring 20, the respective sections 21 of which are united at their ends by joints 22 of the tongue-and-groove type and held in assembled relation by a resilient spring 23.

The ring has an inner cylindrical fluid-sealing surface 24 and lateral fluid-sealing surfaces 25, the former adapted to be held in snug engagement with the surface of the rod to be packed, and the latter in engagement with a complementary packing surface of the stuffing-box or a complementary surface of an adjacent packing ring.

The separable joints between the packing rings may be of any appropriate number and of uniform construction. As best indicated in Fig. 2, each joint may comprise a tongue 26 having an inner cylindrical portion 27, which forms a portion of the cylindrical sealing surface of the ring, and lateral surface portions 28 which may extend into and be held in frictional contact with complementary lateral surface portions 29 of a groove 30 in an adjacent section.

The grooved portions of the ring sections have inner cylindrical surface portions 31 which cooperate with the cylindrical portion 27 of the tongue which enters the groove to form a part of the cylindrical sealing surface of the ring.

The end 32 of the grooved portion of a section overlaps the adjacent portion 33 of an adjoining section at the base of the tongue which enters the groove, the surfaces of the portions 32 and 33 being such as to make contact along a plane extending diagonally from the cylindrical surface of the ring towards its opposite surface, as indicated at 34 (Fig. 1).

The lengths of the tongues 26 and of the grooves 30 are such that the ends 35 of the tongues will be spaced or separated from the ends 36 of the grooves when the ring is assembled in sealing engagement with the rod to be packed, thus leaving openings 37 at the bases of the grooves beyond the ends of the tongues as indicated in Fig. 1.

Preferably the ring sections 21 will be of varying radial thickness, as best indicated in Fig. 3, the greatest thickness being along the intermediate parts of the segments, each of which may be gradually tapered off toward its opposite ends. This tapering-off of the ends of the ring segments is of importance, first, as a means of affording a fairly well defined region of contact between the spring 23 and the central portion of each of the ring sections so that they will be held in snug engagement with the rod, and, second, as a means of providing surplus material along the central portion of the ring sections to prevent them from being unduly thinned along such central portions as they are worn away by frictional engagement with the rod.

If desired, appropriate means may be provided to maintain the spring in a well-defined position with respect to the ring sections. One satisfactory form of spring-positioning means, illustrated by Figs. 1 and 3, consists in providing one of the sections with a screw 38 having a head 39 extending beyond the surface of the ring section and into an opening 40 in the spring.

From an inspection of Fig. 1 it will be apparent that the assembled ring has an inner cylindrical fluid-sealing surface which is continuous throughout its circumference and from side to side, except at the small areas 37 between the ends of the tongues and the bases of the grooves. The lateral surface portions at the opposite sides of the assembled ring are also continuous and unbroken from its internal surface throughout a material portion of its radial extent, thus affording a highly satisfactory and efficient fluid seal between the ring and the rod and between the ring and adjacent lateral surface at either side. These surfaces are unchanged except that the openings 37 grow slightly smaller as the ring sections are gradually closed about the rod by the springs as their surfaces wear away.

The form of the invention illustrated by Figs. 4 to 7, inclusive, differs from that illustrated by Figs. 1 to 3, inclusive, in that the cylindrical sealing surface is external rather than internal. This form of packing comprises a sectional ring 20', the component elements 21' of which are united by joints 22' of the tongue-and-groove type and held in their assembled relation by means of an inwardly-disposed resilient expanding ring 23'.

The ring as a whole has an externally-disposed cylindrical fluid-sealing surface 24' and parallel plane lateral sealing surfaces 25'.

Figure 5:
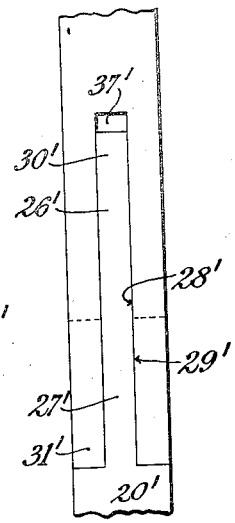
Fig. 5 is an edge view of a portion of the packing ring shown in Fig. 4, illustrating one of the tongue-and-groove joints between the ring sections.

As best illustrated by Figs. 4 and 5, the joints comprise tongues 26' having external cylindrical surfaces 27' and parallel lateral surfaces 28' adapted to have sliding contact with complemental parallel plane surfaces 29' of grooves 30' in the adjoining end of an adjacent ring section.

Externally-disposed cylindrical portions 31' of the grooved part of one section cooperate with the externally-disposed cylindrical portion 27' of the tongue of an adjoining section to provide a portion of the cylindrical sealing surface of the ring as a whole.

The ends 32' of the grooved portion of each ring have an overlapping relation with the portions 33' at the base of the tongue of an adjoining ring, as indicated in Fig. 4, and these overlapping portions make contact along a separating plane 34' extending diagonally from the externally-disposed cylindrical sealing surface of the ring towards its opposite surface.

When the ring is assembled in its sealing relation with respect to the part to be packed, the ends 35' of the tongues should be spaced from the opposing part 36' of an adjoining ring to permit the ring segments to be collapsed sufficiently to facilitate the assembling and disassembling of the packing. This spacing of the parts results in a slight opening 37' (Fig. 5), which is the only break in the continuity of the cylindrical sealing surface of the ring. Except as to these openings 37', the externally-disposed cylindrical sealing surface and the lateral surfaces 25' for a considerable distance from the periphery of the ring towards its inner surface are continuous and unbroken, and this condition of continuity will be maintained as the ring wears away and is expanded by the spring 23' until the radial thickness of the ring sections equals but a small fraction of the thickness of the sections of a ring when newly installed.

Figure 6:
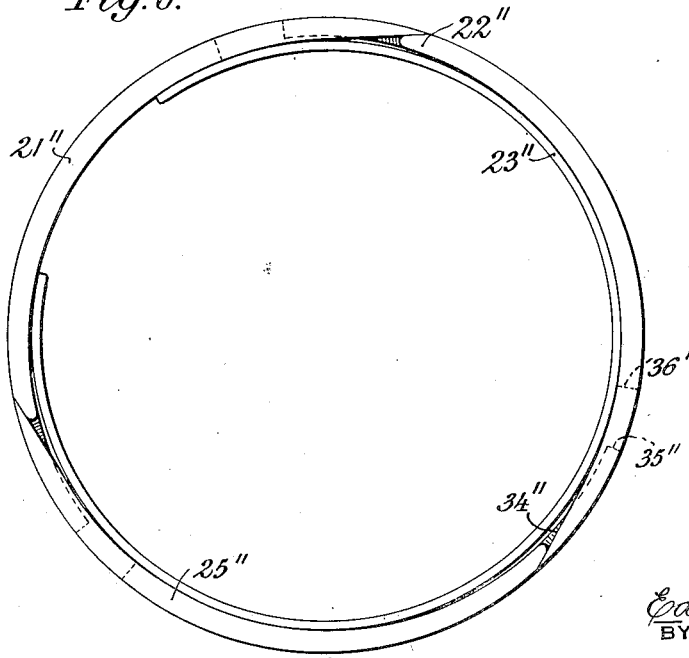
Fig. 6 is a side view of the packing ring illustrated by Fig. 4, the parts being represented as having been materially worn down at their outer peripheries as a result of long use.
Figure 7:
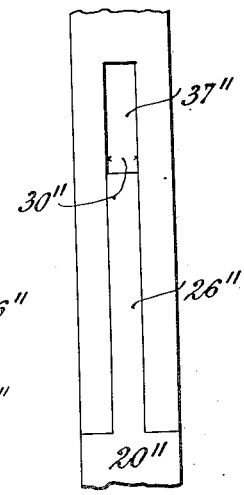
Fig. 7 is an edge view similar to that shown in Fig. 5, the parts of the sections at a joint being represented as having been opened out due to the adjustment to compensate for wear.

The effect of wear upon a ring of the type of the one illustrated by Figs. 4 and 5 is clearly indicated by Figs. 6 and 7. As the external surface is worn away and the ring sections are expanded by the spring, the length of the opening 37' (Fig. 5) increases as indicated at 37'' (Fig. 7), but the continuity of the external fluid-sealing surface and the adjacent lateral sealing surfaces is otherwise unaltered.

The spring ring 23' may be held in any predetermined position with respect to the packing ring by any appropriate means, such as the screw 38', 39' in one of the ring sections and the opening 40' in the spring ring to receive the head of the screw.

The parts of the worn ring as illustrated by Figs. 6 and 7 are identified by the same reference characters as are used in identifying the corresponding parts of the ring as illustrated by Figs. 4 and 5 except that seconds have been substituted for primes.

The spacing of the component sections of the rod packing ring illustrated by Figs. 1 to 3, inclusive, so as to freely admit fluid pressure between the ends of the sections from the space external to the ring, is an advantage rather than a disadvantage. The resultant of the fluid pressure upon the various sections of the ring tends to close them snugly about the rod and produce frictional contact between their inner surfaces and the surface of the rod. If the pressure is high, this frictional contact may be excessive, and the pressure in opposite directions between the ends of the ring within the orifice 37, as well as the pressure in opposite directions within the notched portions 41 (Fig. 1), tends to partly balance the external pressure and reduce the degree of frictional engagement between the packing ring and the rod as compared with ring sections having closely-contacting end portions.

The fluid pressure between the sections of packing of the type of that illustrated by Figs. 4 to 7, inclusive, has a tendency to increase rather than to diminish the frictional contact between the ring sections and the element which they seal. This is, however, of no material consequence. The sealing surface of the form of the packing ring illustrated by Fig. 1 is relatively small as compared with the external surface which is exposed to the fluid to be sealed, and the pressure per square inch between the rod and the sealing surface of the packing ring is relatively great as compared with that of the ring illustrated by Fig. 4 in which the sealing surface is relatively large compared with the surface which is exposed to fluid pressure, and the pressure per square inch between the sealing surface of the ring and the part to be sealed, correspondingly small.

The invention is not intended to be limited to either of the forms herein selected for purposes of illustration but should be regarded as including modifications and variations thereof within the scope of the appended claims.

What is claimed is:

1. A sectional packing ring having a cylindrical fluid-sealing surface and joints of the tongue-and-groove type between the adjacent ends of its component sections, the tongues at the joints having cylindrical surfaces forming parts of the cylindrical sealing surface of the ring and lateral plane surfaces perpendicular to the cylindrical sealing surface, the grooved portions of the ring sections having cylindrical surfaces forming parts of the cylindrical sealing surface of the ring and plane surfaces so positioned as to have sliding contact with the lateral surfaces of the tongues, the ends of the grooved portions of the ring sections and the adjacent portions of the ring sections at the bases of the tongues having lapping relations along complementary plane surfaces defined by dividing planes extending diagonally from the sealing surface of the ring towards its opposite surface, the overlapping portions of the ring sections along said dividing planes being in mutual contact from the cylindrical sealing surface of the ring throughout a material portion of each joint, the opposed portions of the ring sections at the ends of the tongues being spaced, and the ring sections being adjustable with respect to each other to compensate for wear without interfering with the continuity of the material at its joints.

2. A sectional packing ring, as defined by claim 1, having continuous parallel plane lateral fluid-sealing surfaces.

3. A sectional packing ring, as defined by claim 1, of which the ring segments are of gradually increasing radial thickness from their end portions towards their center portions.

4. A sectional packing ring, as defined by claim 1, of which the cylindrical fluid-sealing surface is its internal surface.

5. A sectional packing ring, as defined by claim 1, having its cylindrical sealing surface disposed internally and having a means of communication between the spaces between material portions of the ends of its sections and the externally-disposed space, whereby the effect of fluid pressure on the ring sections may be partly balanced as a means of avoiding excessive pressure between the sections of the packing ring and the rod to be packed thereby.

6. A sectional packing ring, as defined by claim 1, of which the cylindrical fluid-sealing surface is its external surface.

EDGAR N. FOX.